United States Patent [19]

Zukerman et al.

[11] Patent Number: 5,525,366

[45] Date of Patent: Jun. 11, 1996

[54] PROCESS FOR PREPARING FOOD PRODUCTS HAVING GRAIN SHELLS AND ENCLOSED NON GRAIN INTERIORS

[76] Inventors: Harold W. Zukerman; Rachel B. Zukerman, both of 4125 W. Yorkshire La., Northbrook, Ill. 60062

[21] Appl. No.: 535,462

[22] Filed: Sep. 25, 1995

Related U.S. Application Data

[63] Continuation-in-part of Ser. No. 284,227, Aug. 2, 1994, abandoned.

[51] Int. Cl.$^6$ ............................... A23L 1/10; A23L 1/182
[52] U.S. Cl. ............................... 426/274; 426/92; 426/93; 426/96; 426/102; 426/282; 426/618
[58] Field of Search ............................... 426/92, 93, 94, 426/96, 102, 274, 282, 283, 284, 514, 516, 618

[56] References Cited

U.S. PATENT DOCUMENTS

| | | | |
|---|---|---|---|
| 3,450,538 | 6/1969 | McKown et al. | 426/282 X |
| 3,711,295 | 1/1973 | Zukerman | 426/618 |
| 3,961,087 | 6/1976 | Zukerman | 426/618 X |
| 4,520,034 | 5/1985 | Ishii et al. | 426/96 |
| 4,539,211 | 9/1985 | Armando et al. | 426/96 X |
| 4,693,900 | 9/1987 | Molinari | 426/128 |
| 4,764,390 | 8/1988 | Zukerman et al. | 426/618 X |
| 5,120,554 | 6/1992 | Farnsworth et al. | 426/282 |
| 5,137,745 | 8/1992 | Zukerman et al. | 426/618 |

*Primary Examiner*—Arthur L. Corbin

[57] ABSTRACT

The present invention relates to a process for making a food product having an outer grain shell component comprised of visible, cooked cereal grains or parts of cereal grains, joined together, enclosing or enveloping completely an interior filling component comprised of foods that are substantially free of cereal grains. The food product is subsequently heated to firm the texture of the outer grain shell component.

16 Claims, 2 Drawing Sheets

PROCESS FOR PREPARING FOOD PRODUCTS HAVING GRAIN SHELLS AND ENCLOSED NON GRAIN INTERIORS

REFERENCE TO PRIOR ART APPLICATION

This application is a continuation in-part of U.S. application Ser. No. 08/284,227, filed Aug. 2, 1994 now pending.

BACKGROUND OF THE INVENTION

In the prior art, finely ground powders or flours of cereal grains have been additionally used to make the outer shell component of food products such as: 1) toasted pastry products, 2) filled pasta products such as ravioli, dumplings, and turnovers, 3) fat fried egg rolls and pizza rolls, 4) burritos, and 5) pot pies that have a filling enclosed within an outer shell. The most popular of the finely ground powders or flours has been wheat flour because when mixed, wheat flour and water develops into a homogeneous dough that has special properties that include: a) elasticity, i.e. with this property, the sheets of dough can be stretched like elastic. b) the uncooked gluten dough irreversibly firms when heated, c) wheat gluten dough sheets are very structurally strong, d) the gluten structure of the wheat flour and water doughs are able to retain the dispersed gases and the expansion of the structure can be controlled when baked.

There are also dual textured food products that have fruit fillings and oatmeal cookie dough-like shells, made from a wheat flour and water dough, that also contains very small pieces of dry oat flakes dispersed together with the wheat dough mixture.

There are also several patents: U.S. Pat. No. 3,711,295; U.S. Pat. No. 3,961,087; U.S. Pat. No. 4,764,390; and U.S. Pat. No. 5,137,745 that teach how to make shaped grain products. However, these patents generally teach how to make shaped grain products having both their interiors and exteriors comprised of cereal grains. U.S. Pat. No. 5,137,745 teaches how to produce open-faced grain cups, which could be filled with food, the food thereby comprising a second component. However, the prior art open-faced grain cups having a filling component: a) cannot be heated in a pop-up toaster because the component will spill out and burn when the grain cup is inserted into the toaster slots; b) could spill out if the unit is inverted or tipped while being transported in a car, on a bicycle, or in a backpack; and c) ate mote expensive to package because the units have to be specially positioned fight-side up in the packaging container so the interior filling component will not spill out.

Although grain cups with an open-faced filling component are taught in the prior art, it would be useful if grain food products were available which not only offered the healthy, wholesome, nutrition of traditional entrees made with whole cereal grains such as rice topped with chunks of vegetables and meat or cooked oatmeal topped with chunks of fruit, but also had the additional benefits of being: 1) re-heatable from the frozen state by inserting into a pop-up toaster; 2) transportable without spillage, and 3) packaged more inexpensively. The products of the present invention offer these additional benefits.

BRIEF SUMMARY OF THE INVENTION

The present invention relates to a process for making a food product having an outer grain shell component comprised of visible, cooked cereal grains or parts of cereal grains, joined together, enclosing or enveloping completely an interior filling component comprised of foods that are substantially free of cereal grains.

The outer grain shell component can be made from cereal grains from only one genus or combinations of two or mote different grain genera. The grains can be whole grains such as: oats, wheat, rice or corn, or grains modified by flattening them into thick flakes or cutting them with a steel cutter. The outer grain shell component is made by cooking cereal grains by temperatures over 190° F. without excess water so all the soluble gums and starch are retained with the grains. The grains can absorb water at 2 to 4 times their dry weight. The cooked grains can be used immediately at the completion of the cooking cycle or cooled and used later. The enclosed interior filling component of the food product is prepared separately and comprised of foods that are substantially free of cereal grains, and include foods such as: diced or sliced fruits. vegetables, meats, poultry, and/or their combinations.

The outer grain shell component and the enclosed interior filling component are then formed into units by several methods: 1) Depositing the foods of the interior filling component between two preformed grain sheets comprised of visible, cooked cereal grains. The units are formed when the grain sheets are cut and the interior filling component is enclosed. 2) Coextrusion. By this method the units are formed by pumping the cooked cereal grains through one low shear pumping means and simultaneously pumping the interior filling component having foods substantially free of cereal grains, through a second low shear pumping means, and then merging both components before cutting them into units and enclosing their interior filling components. The formed enclosed units are then heated by oven baking or fat frying and then frozen.

It is an object of the present invention to provide a hot dinner entree that contains an outer shell component comprised of visible grains of cooked rice with an enclosed interior component comprised of diced vegetables and meat.

It is another object of the present invention to provide a low at or no fat food product that contains an outer shell component comprised of mixed grains such as brown rice, oats, and wheat dispersed together and an enclosed interior filling component comprised of low fat foods substantially free of cereal grains.

It is another object of the present invention to provide a food product having a shell component comprised of cooked rice grains and an enclosed interior filling component that is transportable without spillage.

It is another object of the present invention to provide a hot breakfast entree comprised of an oatmeal outer shell component and an enclosed interior filling component of fruit that could be reheated from the frozen state in a pop-up toaster.

It is still another object of the present invention to provide a food product having a shell component comprised of cooked rice grains and an enclosed interior filling component comprised of foods that are free of cereal grains which can be more economically packaged because they can be randomly filled into containers.

DETAILED DESCRIPTION OF THE PREFERRED EMBODIMENT

Figure 1:
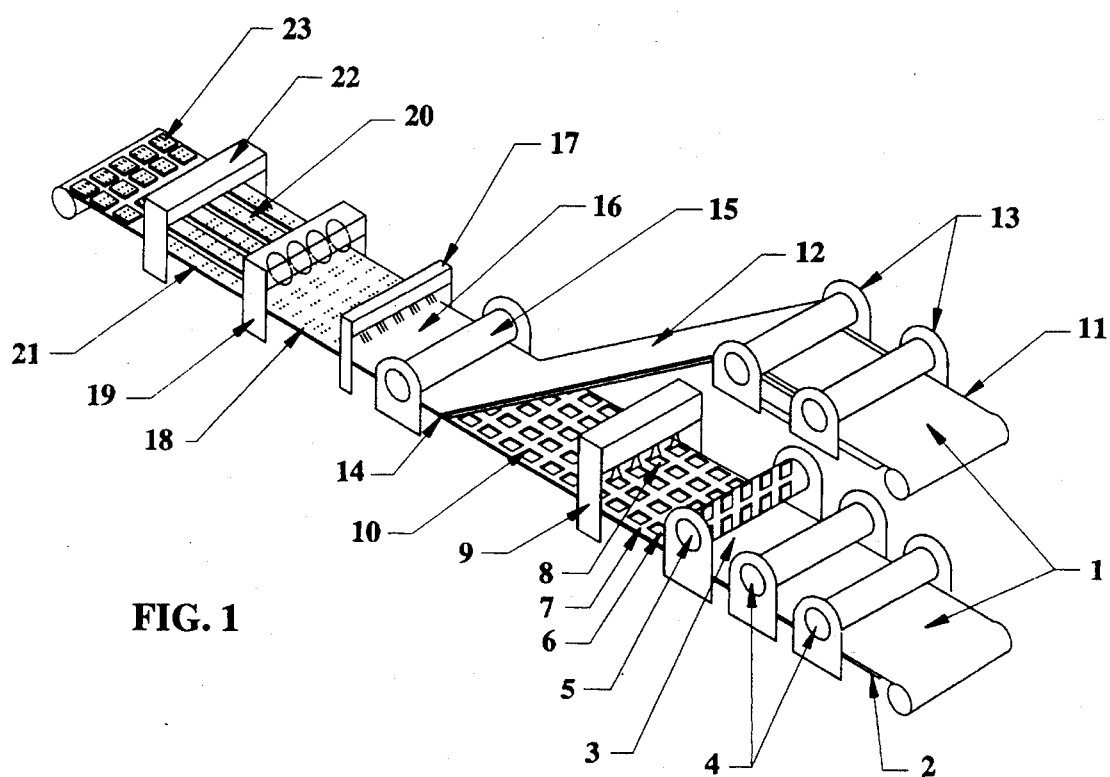
FIG. 1 illustrates the steps for one method of forming food products having an outer grain shell component comprised of visible, cooked cereal grains joined together and an enclosed interior filling component comprised of foods that are substantially free of cereal grains. In this method, the foods of the interior filling component are deposited between two cereal grain sheets. The sheets are then cut into units, enclosing their interior filling component.
Figure 2A:
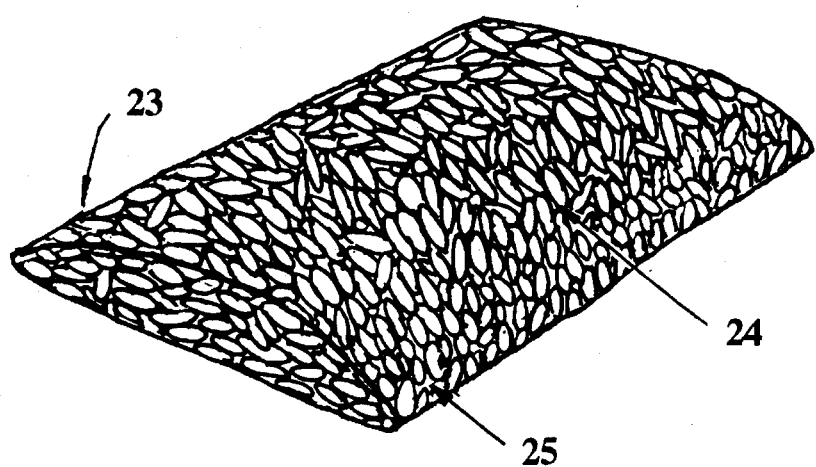
FIG. 2A is a perspective view of a formed unit (23) from FIG. 1 depicting the outer grain shell component (24) and the visible, cooked cereal grains joined together (25)
Figure 2B:
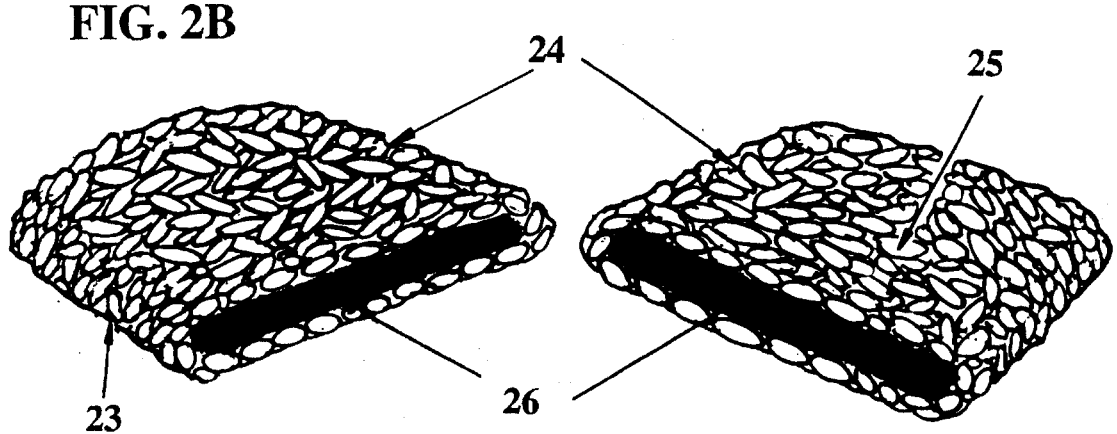
FIG. 2B illustrates a cross-sectional view of the formed unit (23) from FIG.1 and FIG. 2A. The unit is cut in half to illustrate the enclosed interior filling component comprised of foods substantially free of cereal grains (26) and the outer grain shell component (24) comprised of visible cooked cereal grains joined together (25).

The present invention relates to a food product having an outer grain shell component comprised of visible, cooked cereal grains or parts of cereal grains joined together enclosing or enveloping completely an interior filling component comprised of foods that are substantially free of cereal grains.

In the process of the present invention, the outer grain shell component can be made from cereal grains from only one genus or from combinations of two or more different grain genera. The grains can be whole grains such as: oats, wheat, white rice, brown rice, wild rice, corn, rye, buckwheat, or barley, or grains modified by flattening them into thick flakes or cutting them with a steel cutter.

The cereal grains are cooked without excess water and gently blended at temperatures higher than 190° F. The water and/or steam is used in an amount which is controlled so that, after the absorption of the water by the grains and the evaporation of water during the cooking step, there is no excess water remaining with the cooked grains. The grains can absorb water at the rate of two to four times their dry weight. In addition to the absorbed water, the cooked grains acquire both cohesive and lubricity properties during the cooking operation.

Surface grain cohesiveness is needed to facilitate the joining of the cooked grains to one another. This is accomplished when the soluble starches and gums that are leached from the grains during cooking are absorbed onto the grains' surfaces when the water is absorbed into the grains. Lubricity is also needed because when thin grain sheets or grain shell components are formed, the cooked grains which are soft, sticky and very fragile have to be compressed into thin sheets without destroying the cereal grains structures. There are several techniques that are used to facilitate this objective. One method is to add lubricity from fat and/or starch complexing agents to the cooked cereal grains. This lubricity, which is added during the cooking process, prevents the sticky, cooked cereal grains from later adhering to the process equipment when the cooked cereal grains are compressed into thin sheets or shells during the unit shaping operation. The proper balance of cohesiveness and lubricity is achieved when both 1) the individual grains become joined together and 2) the formed thin grain shell component easily releases from the forming equipment. The lubricity level is too high when the cooked grains do not become joined together during the cooking operation. The lubricity level is too low when the cooked grains stick to the forming equipment. Cooked grains that are not excessively sticky do not need added fats and/or starch complexing agents.

The grains can also be cooked together with: flavors, fruit juice, vegetable oil, soup base, herbs, spices, diced vegetables, diced fruits, milk, diced onions, and red and green peppers, salt, sugar, and other flavoring ingredients. Binders that cause the grains to become joined together such as gums, pectins, or starch can also be added to the cooking water. Starch complexing agents that complex the grains' starch and prevent retrogradation can also be added to the cooking water. The cooked grains do not have to be cooled if they are formed into the cereal grain shell component immediately at the completion of the cooking cycle. If the hot cereal grains are not formed into the shell component within a short time after the conclusion of the cooking cycle, they are cooled to temperatures lower than 160° F. and used later. If the cooked grains are not cooled to stop the grain cooking and water absorption, the hot grains continue to cook and become over-cooked. Grain cooling is accomplished in a manner that allows the grains to remain joined together. The grains can be cooled with controlled amounts of added ice or cold water or refrigerated air. They should not be cooled by adding water and then draining the added water because that procedure extracts the soluble starch and gums from the grains' surfaces and reduces their surface cohesiveness.

The enclosed interior filling components of the food products of the present invention are prepared separately and are comprised of foods that are substantially free of cereal grains and include foods such as: diced or sliced fruits, vegetables, meat, ham, poultry, red or green peppers, raisins, beans, mushrooms, herbs and spices, fruit juice, vegetable oil, soup base, gravies, or their combinations. These foods can be incorporated into the interior of the foods while frozen, raw, blanched, or fully cooked. Also, the free liquid with the food particles should be thickened so it would not be able to easily migrate to and wet the cereal grains in the shell. If the interior filling component has free liquid, it can be thickened with starch, gums, and/or pectin.

The outer grain shell component and the enclosed interior filling component are then merged and formed into units comprised of both components. This is achieved by several methods: 1) depositing the foods of the interior filling component between two pro-formed grain sheets comprised of visible cooked cereal grains. The units are formed when the grain sheets are cut and the interior filling component is enclosed. 2) Coextrusion. By this method, the units are formed by pumping the cooked cereal grains through one low shear pumping means and simultaneously pumping the interior filling component having foods substantially free of cereal grains through a second low shear pumping means, and then merging both components before cutting them into units and enclosing their interior filling components.

The use of bakery type sheeters is one method that can be used to compress the cooked rice grains into the thin outer grain shell component of the product. The thickness of the formed grain sheet or grain shell should be adjusted to the individual product desired. With some products, it is advisable to provide very thin grain shells so that the product can be fitted into the slots of pop-up toasters. When products are made for pop up toasters, the preferred shell thickness should be about 0.15 inches. The enclosed interior filling component can vary in thickness, depending on the products made. However, for most products that are made for the pop-up toaster, the thickness of the shell is usually no thicker than about 0.25 inches.

FIG. 1 illustrates the steps for one method of forming food products having an outer grain shell component comprised of visible, cooked cereal grains joined together and an enclosed interior filling component comprised of foods that are substantially free of cereal grains. In this method, the foods of the interior filling component the deposited between two cereal grain sheets. The grain sheets are then cut into units, enclosing their interior filling component. In the first step of the process illustrated in FIG. 1, the cooked grains (1) on the conveyor (2) are compressed into a thin grain sheet having visible cooked grains (3) with two or more bakery type dough sheeters (4) that have non-stick surfaces. The jackets of the sheeting rolls can also be cooled with recirculating chilled fluid it the grains are excessively sticky. A rotary die (5) is then used to impress the grain sheet (3) into a continuous sheet (6) having rectangular shaped cavities which is now the product shell (8) with outer rims (7). Food particles that are substantially free of cereal grains (9) that were prepared separately are then deposited into the shells' cavities (8) on the continuous sheet (6) with the depositor (9) forming grain shells having visible, cooked cereal grains, said grain shells now filled with the deposited food particles that are substantially free of cereal grains (10).

A second grain sheet (12) is then formed with tile cooked grains (1) on conveyor (11) with two or more sheeting rolls (13). This top sheet of visible cooked cereal grains is then layered onto the bottom cereal grain sheet filled with the deposited food particles (10) forming the two layered sheet with the enclosed deposited food particles (14). A rotary press (15) then crimps the top grain sheet (12) to the rims (7) of the bottom grain sheet thereby encircling the interior filling component (10). Needle-like blades then cut small pin holes on the top grain sheet (12). The two-layered sheet with pin holes on top (18) am then cut with rotary cutters (19) separated into rows (20) with a conveyor separator (21) and cut into units (23) with a guillotine cutter (22). The cutters simultaneously cut the sheets into units while enclosing the interior filling component.

A second means of forming the enclosed two component units having an outer shell comprised of visible, cooked cereal grains which retain their individual identity, and an enclosed interior filling component comprised of foods that are substantially free of cereal grains is coextrusion. Equipment for coextruding foods is available in the marketplace.

When the units are timed by coextruding the two components with low shear pumps, the units are formed by pumping the cooked cereal grains through one low shear pumping means and simultaneously pumping the interior tilling component having foods substantially free of cereal grains, through a second low shear pumping means, and then merging both components. Then, they are cut into units, which simultaneously seals their ends by enclosing their interior filling components.

The units are then cut with small pin holes on tile top side of tile grain shell component so when the units are later oven baked or fat fried, the steam generated in the enclosed interior filling component can escape. The units are then heated to firm the texture of the outer grain shell component. They can be either oven baked or fat fried. When baking is employed, the temperature of the convection oven should be from about 275° F. to about 500° F. When fat frying is employed, the temperature of the fat should be about 400° F. The units that am fat fried should then be drained or defatted.

In a preferred embodiment, the food products having grain shells and non grain interiors are rapidly frozen. Freezing can be done with either: cold air, liquid nitrogen, or liquid carbon dioxide. It is desirable to freeze the units to about 0° F. The freezing process and freezers suitable for this operation are well-known in the art and are commercially available.

EXAMPLE 1

OAT SHELLS WITH ENCLOSED DICED APPLE INTERIOR FILLING

This example teaches how to make products having outer shell components comprised of visible, cooked oat grains with enclosed diced apple filling components by the process of depositing the diced apples between two grain sheets comprised of visible cooked oat grains.

In this process, the uncooked oat grains were first flattened into 0.040 inch thick flakes. Then, they were cooked at 200° F. in a flavored solution without excess water so all the starch and gums extracted from the grains were retained. The grains were then cooled and formed into two 0.15 inch thick grain sheets with multiple roll sheeters. When this product was made, one sheet of cooked oats was impressed with a rotary die to form rectangular shaped cavities with rims that surround the cavities. The cavities were then filled with a filling component of flavored diced apples which were prepared separately. Then, the second sheet of visible, cooked oats was then layered on top. The two sheets of cooked oats were then pressed together at the outer rims of the flavored diced apple filled cavities thereby enclosing them.

Small pin holes were then cut on the top grain sheet component. Then, rotary and guillotine cutters separated and enclosed the units, which were then baked at 350° F. for eleven minutes or until the outer oat shell component of the product became firm.

The ingredients used to prepare the products were:

| INGREDIENTS | PERCENT |
| --- | --- |
| Water | 68.0 |
| Oat Flakes | 23.0 |
| Sugar | 6.6 |
| Salt | 0.3 |
| Low Fat Dried Milk Solids | 1.7 |
| Apple Flavor | 0.4 |
| Total | 100.0 |

The ingredients used to prepare the products' interior diced apple filling were:

| INGREDIENTS | PERCENT |
| --- | --- |
| Dry diced apples | 10.4 |
| Water | 36.0 |
| Sugar | 49.0 |
| Modified Corn Starch | 4.0 |
| Apple Flavor | 0.5 |
| Coarse Ground Cinnamon | 0.1 |
| Total | 100.0 |

EXAMPLE 2

RICE SHELLS WITH ENCLOSED INTERIOR VEGETABLE FILLING

This example teaches how to form by the coextrusion process, food products having outer grain shells comprised of visible, flavored, cooked rice grains dispersed together with vegetables, diced red pepper, and chopped onions, said rice grain shell enclosing or enveloping completely the interior filling component comprised of mixed vegetables.

The rice grains were cooked at 200° F. in a flavored cooking water solution without excess water so all the starch from the rice grains and the added waxy rice flour were retained with the grains. In this example, the rice grains were not formed into the shell component immediately at the completion of the cooking cycle. The grains were cooled to stop the grain cooking before the grains became over cooked.

The interior filling component was prepared separately. The diced vegetables and bean mixture was flavored with herbs and spices and pasteurized to partially cook the vegetables so their juices would be released and thickened with the added binders.

Figure 3:
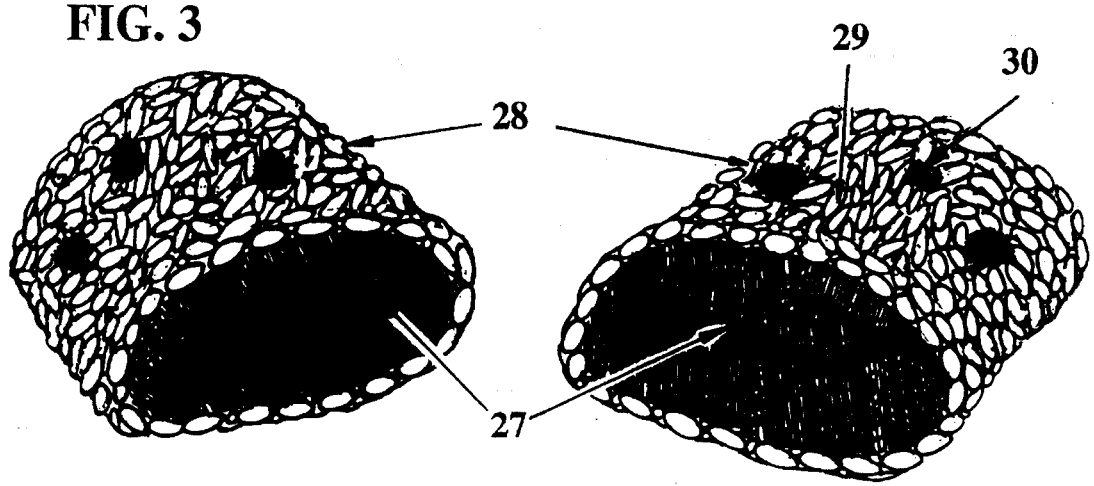
FIG. 3 illustrates a cross-sectional view of the Rice Shells With Enclosed Interior Vegetable Filling food product as described in Example 2. The unit is cut in half to illustrate the enclosed interior filling component comprised of seasoned mixed vegetables and beans (27); and the outer grain shell component (28) comprised of cooked rice grains (29) dispersed together with diced vegetables (30).

The cooked and cooled rice grains were then pumped through one low shear pumping means and the interior filling component comprised of the mixed vegetables were simultmneously pumped separately through a second low shear pumping means. Both components were then merged and cut into units in the configuration illustrated in FIG. 3. The illustration depicts the outer shell component comprised of vegetables dispersed together with the cooked rice grains and the mixed interior filling component comprised of cooked vegetables.

The ingredients used to prepare the products were:

| INGREDIENTS | PERCENT |
| --- | --- |
| Water | 65.5 |
| Long Grain White Rice | 21.0 |
| Red Peppers, diced | 4.0 |
| Chopped Onions | 4.0 |
| Waxy Rice Flour | 2.5 |
| Salt | 0.3 |
| Corn Oil | 0.5 |
| Monoglycerides | 0.2 |
| Herbs, Spices, and Flavors | 2.0 |
| Total | 100.0 |

The ingredients used to prepare the products' interior vegetable filling:

| INGREDIENTS | PERCENT |
| --- | --- |
| Cooked Black Beans | 19.0 |
| Diced Tomatoes | 19.0 |
| Corn | 16.0 |
| Diced Zucchini | 16.0 |
| Diced Jalapeno Pepper | 1.0 |
| Diced Yellow Squash | 8.0 |
| Diced Green Pepper | 8.0 |
| Chopped Onions | 5.5 |
| Salt | 0.2 |
| Flavors, Herbs, Spices | 3.0 |
| Tomato Powder | 0.3 |
| Modified Corn Starch | 4.0 |
| Total | 100.0 |

EXAMPLE 3

LOW FAT MIXED GRAIN SHELLS WITH ENCLOSED INTERIOR FILLINGS

This example teaches how to make low fat products having an outer grain shell component comprised of three cereal grains: wheat, brown rice, and oats disperses together and enclosing or enveloping completely an interior filling component comprised of foods substantially free of cereal grains.

The mixed grain shells are made by flattening wheat grains and oat grains into 0.040 inch thick flakes. Then, equal mixtures of the oats, wheat flakes and long grain brown rice, which require about the same amount of cooking time, are cooked at 200° F. in a flavored solution without excess water so all the starch and gums extracted from the mixed grains and the added waxy rice flour binder are retained with the grains. In this example, there were no added fats or starch complexing agents in the formulation.

The ingredients used to prepare the mixed grain shell were:

| INGREDIENTS | PERCENT |
| --- | --- |
| Oat Flakes | 8.0 |
| Wheat Flakes | 8.0 |
| Long Grain Brown Rice | 8.0 |
| Water | 65.0 |
| Chopped Onions | 4.0 |
| Waxy Rice Flour | 2.2 |
| Diced Red Peppers | 4.0 |
| Herbs, Spices, and Flavors | 0.5 |
| Salt | 0.3 |
| Total | 100.0 |

It is to be understood that the above described process and the above examples are simple illustrative of the application of principles of the invention and many other modifications may be made without departing from the spirit and scope of the invention.

The embodiments of the invention in which an exclusive property or privilege is claimed are defined as follows.

We claim:

1. A process for making a food product having an outer shell component, prepared in a), comprised of visible, cooked cereal grains which retain their grain identity and an enclosed interior falling component comprised of foods that are free of cereal grains, said process comprising the steps of:

a) preparing an interior filling component comprised of foods that are free of cereal grains;

b) cooking cereal grains in water at temperatures higher than 190° F. to produce visible cooked grains that have cohesive surfaces;

c) forming completely enclosed units having an outer grain shell component comprised of visible, cooked cereal grains, prepared in b), which retain their grain identity, and a completely enclosed interior filling component, prepared in a), comprised of foods that are free of cereal grains; and then, d) heating the enclosed units formed in c) to firm the texture of the outer grain shell component.

2. The process of claim 1 wherein the grains absorb water during the cooking process at the rate of two to four times the dry weight of the grains.

3. The process of claim 1 wherein the grain shell component is made with cereal grains selected from the group consisting of: oats, wheat, white rice, brown rice, wild rice, corn, rye, buckwheat, barley, and combinations thereof.

4. The process of claim 3 wherein the grain shell component is made with cereal grains which are modified by either flattening them into thick flakes or by cutting them with a steel cutter.

5. The process of claim 1 wherein the grain shell component is made with cereal grains from only one genus.

6. The process of claim 1 wherein the grain shell component is made with cereal grains from two or more different genera.

7. The process of claim 1 which further comprises, before or during said cooking adding to the cereal grains other ingredients selected from the group consisting of: vegetable oil, starch complexing agents, water binders, flavoring ingredients, soup bases, fruit juices, herbs, spices, milk solids, vegetables, fruits, salt, sugars, onions, red and green peppers, pasta, and combinations thereof.

8. The process of claim 1 wherein the cooked grains prepared in b) are cooled to below 160° F., whenever the cooked grains are not immediately formed into said enclosed units, in a manner that allows the grains to remain joined together.

9. The process of claim 1 wherein each enclosed interior filling component is comprised of foods selected from the group consisting of diced meat, poultry, ham, beans, vegetables, fruit, mushrooms, onions, red and green peppers, raisins, fruit juice, gravies, water binders, soup base, herbs, spices, sugar, vegetable oil, and combinations thereof.

10. The process of claim 1 wherein the enclosed units are formed by pumping the cooked cereal grains through one low shear pumping means and simultaneously pumping the interior filling component through a second low shear pumping means, and then merging both components before forming them into units and completely enclosing their interior filling components.

11. The process of claim 1 which further comprises the step of cutting holes on the top side of the grain shell component.

12. The process of claim 1 wherein the enclosed units are heated by oven baking.

13. The process of claim 1 wherein the enclosed units are heated by fat frying.

14. The process of claim 1 which further comprises the step of freezing the food product.

15. A process for making a food product having an outer grain shell component comprised of visible, cooked cereal grains which retain their grain identity and a completely enclosed interior filling component comprised of foods that are free of cereal grains, said process comprising the steps of:

a) preparing an interior filling component comprised of foods that are free of cereal grains;

b) cooking cereal grains in water at temperatures higher than 190° F. to produce visible cooked grains that have cohesive surfaces;

c) forming grain sheets from the cooked grains in b);

d) depositing the interior filling component prepared in a) between two of said grain sheets comprised of visible cooked cereal grains joined together;

e) cutting the two grain sheets containing the interior filling component into units, whereby said interior filling component becomes completely enclosed between the two grain sheets; and then f) heating the units to firm the texture of the grain shells.

16. The process of claim 15 wherein said grain sheets comprised of visible, cooked cereal grains are formed with bakery type dough sheeters or double roll formers.

\* \* \* \* \*

UNITED STATES PATENT AND TRADEMARK OFFICE
CERTIFICATE OF CORRECTION

PATENT NO. : 5,525,366
DATED : June 11, 1996
INVENTOR(S) : Harold W. Zukerman; Rachel B. Zukerman It is certified that error appears in the above-indentified patent and that said Letters Patent is hereby corrected as shown below:

Column 8, line 38, Claim 1, "prepared in a)," -- should be deleted.
Column 8, line 40, Claim 1, "falling" should read --filling--.

Column 1, line 13, "additionally" should read -- traditionally --.
Column 1, line 46, "ate mote" should read -- are more --.
Column 1, line 48, "fight" should read -- right --.
Column 2, line 4, "mote" should read -- more --.
Column 2, line 40, "at" should read -- fat --.
Column 4, line 47, "pro" should read -- pre --.
Column 4, line 61, " ; " should read -- , --.
Column 5, line 8, "the" should read -- are --.
Column 5, line 16, "it" should read -- if --.
Column 5, line 26, "tile: should read -- the --.

UNITED STATES PATENT AND TRADEMARK OFFICE
CERTIFICATE OF CORRECTION

PATENT NO. : 5,525,366
DATED : June 11, 1996
INVENTOR(S) : Harold W. Zukerman; Rachel B. Zukerman It is certified that error appears in the above-indentified patent and that said Letters Patent is hereby corrected as shown below:

Column 5, line 37, "am" should read -- are --.

Column 5, line 48, "timed" should read -- formed --.

Column 5, line 52, "tilling" should read -- filling --.

Column 5, line 57, "tile" should read -- the --.

Column 5, line 58, "tile" should read -- the --.

Column 5, line 66, "am" should read -- are --.

Signed and Sealed this

Twenty-second Day of October, 1996

*Attest:*

BRUCE LEHMAN

*Attesting Officer*     *Commissioner of Patents and Trademarks*